(12) United States Patent
Henry et al.

(10) Patent No.: US 9,463,820 B2
(45) Date of Patent: Oct. 11, 2016

(54) FOLDABLE PUSHCHAIR SUITABLE FOR TRANSPORTING NEWBORNS

(71) Applicant: BABYZEN, Venelles (FR)

(72) Inventors: Gilles Henry, Boulogne-Billancourt (FR); Jean-Michel Chaudeurge, Tourves (FR)

(73) Assignee: BABYZEN, Venelles (FR)

( * ) Notice: Subject to any disclaimer, the term of this patent is extended or adjusted under 35 U.S.C. 154(b) by 0 days.

(21) Appl. No.: 14/917,963

(22) PCT Filed: Sep. 9, 2014

(86) PCT No.: PCT/EP2014/069177
§ 371 (c)(1),
(2) Date: Mar. 10, 2016

(87) PCT Pub. No.: WO2015/036395
PCT Pub. Date: Mar. 19, 2015

(65) Prior Publication Data
US 2016/0214635 A1    Jul. 28, 2016

(30) Foreign Application Priority Data

Sep. 13, 2013 (FR) ..................................... 13 58847

(51) Int. Cl.
*B62B 7/08* (2006.01)
*B62B 9/14* (2006.01)

(52) U.S. Cl.
CPC ........ *B62B 7/08* (2013.01); *B62B 9/142* (2013.01)

(58) Field of Classification Search
CPC ......... B62B 3/007; B62B 5/08; B62B 5/082; B62B 5/085; B62B 7/00; B62B 7/002; B62B 7/004; B62B 7/006
See application file for complete search history.

(56) References Cited

U.S. PATENT DOCUMENTS 5,087,066 A    2/1992 Mong-Hsing

FOREIGN PATENT DOCUMENTS

| DE | 19748902 A1 | 5/1999 |
| FR | 2933362 A1 | 1/2010 |
| GB | 158 108 A | 2/1921 |
| GB | 1 362 160 A | 7/1974 |

OTHER PUBLICATIONS

International Search Report issued in PCT/EP2014/069177 mailed on Jan. 5, 2015 (2 pages).
Written Opinion of the International Searching Authority issued in PCT/EP2014/069177 mailed on Jan. 5, 2015 (5 pages).

*Primary Examiner* — John Walters
*Assistant Examiner* — James Triggs
(74) *Attorney, Agent, or Firm* — Osha Liang LLP

(57) ABSTRACT

Pushchair which is moveable between an unfolded position and a folded position, comprising a structure with in particular two handle uprights (1, 1'), front legs (3, 3'), rear legs (5, 5'), seat supports (7, 7'), a backrest (2), and hinges (31-35, 41-47) for folding the pushchair flat. The pushchair also comprises a textile base (16), tensioners (18, 18') for tensioning a front part (16a) of the textile base (16), a cover (19) with at least one main bow (20), and fixing elements (23, 23') allowing each side of the main bow (20) to be fixed for example to a fixing point of the front part (16a) of the textile base (16) close to the tensioners. In the unfolded position, the backrest (2) is held against the seat supports (7, 7') and can hold a child in the lying position facing the rear of the pushchair. In the unfolded position, the tensioners (18, 18') are tensioned and allow deployment of the front part (16a) of the textile base (16) and the protective cover (19). On folding, the forward swivelling of the handle uprights (1, 1') loosens the tensioners (18, 18'), causing the folding of the front part (16a) of the textile base (16) and the protective cover (19).

15 Claims, 5 Drawing Sheets ness of the child, particular a textile base 10. The inclinable backrest 2 is mounted pivoting on the pushchair structure by means of a hinge 13, the axis of rotation of which is parallel to hinges 31, 32, 33, 34, 35, 36 for folding the pushchair.

FOLDABLE PUSHCHAIR SUITABLE FOR TRANSPORTING NEWBORNS

TECHNICAL FIELD

The present invention concerns a foldable pushchair which can be used right from birth and is moveable between an unfolded, or deployed, position and a folded position.

BACKGROUND

In the prior art, there are many types of foldable pushchair. In particular we distinguish the category of flat-folding pushchairs in which all hinges allowing the structure to be folded have parallel rotation axes oriented in a direction transverse to the direction of movement of the pushchair.

U.S. Pat. No. 5,087,066 illustrates an example of a flat-folding pushchair which is simple to convert from the unfolded position to the folded position and vice versa.

FIG. 1 shows in a diagrammatic side view an example of a flat-folding pushchair according to the first type of folding, the pushchair being shown in the unfolded position.

The structure of the pushchair comprises a number of elements including the handle uprights 1, 1', an inclinable backrest 2, front legs 3, 3' fitted with rolling means 4, 4', rear legs 5, 5' fitted with rolling means 6, 6', seat supports 7, 7', a handle 8 mounted in an extension of the handle uprights 1, 1'. On the side view in FIG. 1, elements 1', 3', 4', 6', 7' are not visible. Also the structure of the pushchair comprises a number of hinges 31, 32, 33, 34, 35, the axis of rotation of which is perpendicular to the plane of the drawing, allowing the pushchair to be folded. Finally the structure is fitted with textile elements for ergonomics and the comfort of the child, in particular a textile base 10. The inclinable backrest 2 is mounted pivoting on the pushchair structure by means of a hinge 13, the axis of rotation of which is parallel to hinges 31, 32, 33, 34, 35, 36 for folding the pushchair.

Such a pushchair is suitable for transporting a child in the seated or inclined position, facing forward in the direction of movement of the pushchair.

Patent application FR 2933362 illustrates another type of pushchair according to the prior art which offers the advantage of being particularly compact in the folded position. In fact this document describes a foldable pushchair in which, in the folded position, the upper edge of the backrest comes to lie on the upper end of the front leg and the lower end of the rear leg. Thus the backrest, front leg and rear leg, all three of which have a substantially similar length, are superimposed in the folded position. Consequently the largest dimension of such a pushchair in the folded position is substantially equal to the height of the backrest.

FIGS. 2A to 2C illustrate, in a diagrammatic side view, an example of a flat-folding pushchair according to the second type of folding, the pushchair being shown respectively in the unfolded position (FIG. 2A), in the semi-folded position (FIG. 2B) and in the folded position (FIG. 2C).

The structure of the pushchair comprises, as well as the handle uprights 1, 1', inclinable backrest 2, front legs 3, 3', rear legs 5, 5', seat supports 7, 7' and handle 8 as described above, backrest connecting rods 51, 51', front leg connecting rods 61, 61' and a number of hinges 41, 42, 43, 44, 45, 46, 47, the axis of rotation of which is perpendicular to the plane of the drawing, allowing the pushchair to be folded flat. The upper end of the front legs 3, 3' is mounted pivoting on the hinge 41, the axis of which corresponds to the front edge 9 of the seat formed between the seat supports 7, 7'. The upper end of the rear legs 5, 5' is mounted pivoting on the hinge 44 situated on the lower part of the handle uprights 1, 1'. The backrest connecting rod 51 is mounted pivoting firstly on the hinge 41 and secondly on the hinge 43 situated on an intermediate point of the handle uprights 1, 1'. The front leg connecting rod 61 is mounted pivoting firstly on the hinge 42 situated at an intermediate point of the front legs 3, 3' and secondly on the hinge 46 situated at the lower end of the handle uprights 1, 1'. The handle 8 is mounted pivoting on the handle uprights 1, 1' about hinge 47.

In side view, the shape formed by the hinges 41, 43, 44, 45 is a deformable quadrilateral 50 situated in the central part of the pushchair structure. In the unfolded position (FIG. 2A), this quadrilateral 50 has the shape of an arrow head. When the pushchair is folded (FIGS. 2B and 2C), this quadrilateral 50 deforms by the relative movement of hinge 44 away from the hinge 41.

Also the shape formed by hinges 41, 43, 46, 42 is a deformable pseudo-parallelogram 60. The pseudo-parallelogram is dependent on the quadrilateral 50 insofar as the hinges 43, 44 and 46 are fixed on the same structural element of the pushchair, namely the handle uprights 1, 1'. Thus deformation of the quadrilateral 50 described above causes a concomitant deformation of the pseudo-parallelogram 60.

The result of the structure thus described, on movement of the pushchair from its unfolded position to its folded position, is the forward swivelling of the lower ends of the rear legs 5, 5', the rearward swivelling of the lower ends of the front legs 4, 4', the folding of the handle uprights 1, 1' against the seat supports 7, 7' such that the upper edges of the handle uprights 1, 1' come to face the front end 9 of the seat supports 7, 7' and the upper ends of the front legs 3, 3', allowing a particularly compact folding.

A textile base 10 is fixed to the structure of the pushchair, thanks in particular to tensioners 12, 12' connecting the upper end of the handle uprights 1, 1' to the front edge 9 of the seat formed between the seat supports 7, 7' (on FIGS. 2A to 2C, element 12' is not shown). These tensioners 12, 12' allow deployment of the sides of the textile base 10, thus forming an advantageous side protection for the child seated in the pushchair. On folding of the pushchair (FIG. 2B), the upper end of the handle upright 1 moves closer to the front edge 9 of the seat. When the pushchair is fully folded (FIG. 2C), the upper part of the backrest 1—and consequently the upper edge 2 of the backrest—comes to lie on the front edge 9 of the seat in the folded position. The foldable pushchair thus produced is compact since its greatest dimension is substantially equal to the length of the handle upright.

However, said pushchairs are not totally satisfactory for the transport of a newborn infant. In fact they are designed for transporting a child facing forward. It is generally agreed that for a child of less than 6 months, the best transport position is facing the parent pushing the pushchair, lying flat or in a very inclined position.

To remedy this drawback, in the prior art there are numerous types of foldable crib adapted to the pushchairs, which supplement these to allow the transport of a newborn infant. Patent application DE 19748902 illustrates an example of a foldable crib according to the prior art. However such a device is not totally satisfactory in the case of a pushchair of the type described, since it must be removed prior to folding, or it must be folded at the same time as the pushchair, preventing a compact folding. Furthermore it does not have a protective cover which effectively protects the newborn infant from the effects of the sun.

The aim of the invention is to remedy these drawbacks by proposing a flat-folding pushchair which can be used from birth, which is fitted with a protective cover and is easily moveable between an unfolded position and a folded position.

GENERAL PRESENTATION

To this end and according to a first aspect, the invention concerns a flat-folding child's pushchair which is moveable between an unfolded position and a folded position comprising:
- a structure comprising two handle uprights, at least one front leg, at least one rear leg, seat supports, a backrest and hinges for folding the pushchair flat;
- a textile base;
- tensioners for tensioning a front part of the textile base and each connecting an upper end of the handle upright to a structural element situated at the front of the pushchair;
- a cover with at least one main bow.

According to a first aspect of the present description:
- the protective cover also comprises fixing elements allowing each side of the main bow to be fixed to at least one fixing point of each of the tensioners or to at least one fixing point of the front part of the textile base, advantageously close to the tensioners;
- in the unfolded position, the backrest is positioned to hold a child at least in a lying position facing the rear of the pushchair, said backrest being also held against the seat supports thanks to a fixing system;
- in the unfolded position, the tensioners are tensioned and allow deployment of the front part of the textile base and the protective cover;
- on folding, the forward swivelling of the handle uprights loosens the tensioners, causing the folding of the front part of the textile base and the protective cover.

The pushchair thus described is a flat-folding pushchair suitable for transport of a newborn infant facing the parent, which also has a protective cover for the child which deploys and is tensioned automatically when the pushchair is unfolded.

According to a variant, the main bow of the protective cover is mounted on a structural element by means of a hinge with axis perpendicular to the direction of movement of the pushchair. This configuration ensures excellent tension of the cover when the pushchair is unfolded.

According to a variant, the fixing elements for the protective cover are detachable and may optionally be repositioned in different positions of the tensioners or the textile base. In this case, when the pushchair is unfolded, the protective cover is deployed into the position it held prior to folding.

According to a variant, a front part of the protective cover is held fixed to the upper part of the backrest, to help ensure an excellent tension of the protective cover when the pushchair is unfolded.

According to a variant, the tensioners each connect an upper end of a handle upright to an upper part of the backrest, in order to ensure better lateral protection of the child.

According to a variant, the backrest is mounted pivoting on a structural element by means of a hinge with axis perpendicular to the direction of movement of the pushchair. This allows optional adjustment of the backrest position and also facilitates folding.

According to a variant, the backrest is reversible in that, in the unfolded position of the pushchair, it can move from a first position adapted to hold a child in the lying position facing the rear of the pushchair, to a second position adapted to hold a child in the seated position facing the front of the pushchair. This particularly advantageous configuration allows one and the same structure to be retained for two pushchairs, one suitable for transport of a newborn infant facing the parent and the other suitable for transport of a child facing forward.

According to a variant, a rear part of the textile base is fitted with a rigid plate to support the newborn infant.

According to a variant, the pushchair also comprises a rigid or semi-rigid dorsal plate, a rear end of which is mounted pivoting at the back of the textile base, in order to be able to adjust the position of the child in the pushchair.

According to a variant, the pushchair folds in the manner described by means of FIGS. 2A to 2C, in which on movement of the pushchair from its unfolded position to its folded position, the hinges allow the forward swivelling of the lower ends of the rear legs, the rearward swivelling of the lower ends of the front legs, the folding of the handle uprights against the seat support, wherein the upper edges of the handle uprights come to face the front end of the seat support and the upper ends of the front legs. This type of folding is particularly advantageous for a very compact pushchair in the folded position, despite the textile base and the cover.

Advantageously according to the latter variant, the main bow of the protective cover is mounted on an upper end of the rear leg on each side of the pushchair by means of a hinge with axis perpendicular to the direction of movement of the pushchair. Advantageously the axis of the hinge of the main bow is offset in relation to the hinge of the rear leg on the handle upright. On folding of the pushchair, this particular configuration allows the hinge of the main bow to move away from the edge of the seat formed between the seat supports, such that it occupies a minimal space in relation to the structure of the pushchair.

Similarly, the backrest is advantageously mounted pivoting on a lower end of the handle uprights by means of a hinge of axis perpendicular to the direction of movement of the pushchair, so that on folding, the hinge of the backrest can move away from the seat edge such that this takes up a minimum space in relation to the structure of the pushchair.

BRIEF DESCRIPTION OF THE DRAWINGS

Further objects and advantages of the invention will appear during the description which follows, with reference to attached drawings in which.

DETAILED DESCRIPTION OF EXAMPLES

In the figures, identical elements carry the same references.

A "hinge" or a "hinge system" in the present application is understood to mean any device allowing freedom of pivoting between two parts.

The "front" and the "rear" of the pushchair are defined in its normal direction of movement.

Figures 1, 2A, 2B, 2C:
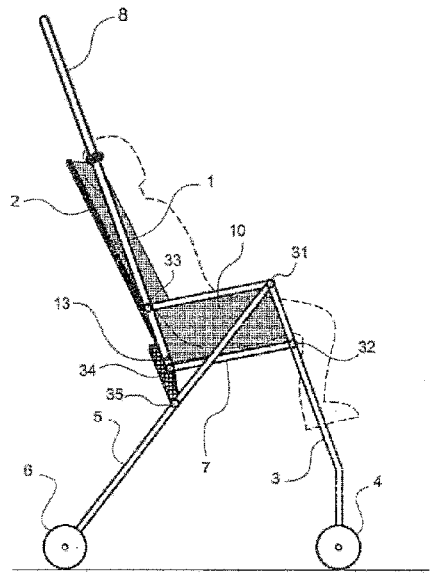
FIG. 1 is a diagrammatic side view of an example of a pushchair according to the prior art using a first type of folding, in the unfolded position (already described)
FIGS. 2A to 2C are diagrammatic side views of an example of a pushchair according to the prior art using a second type of folding, respectively in the unfolded, semi-folded and folded positions (already described)
Figure 3A:
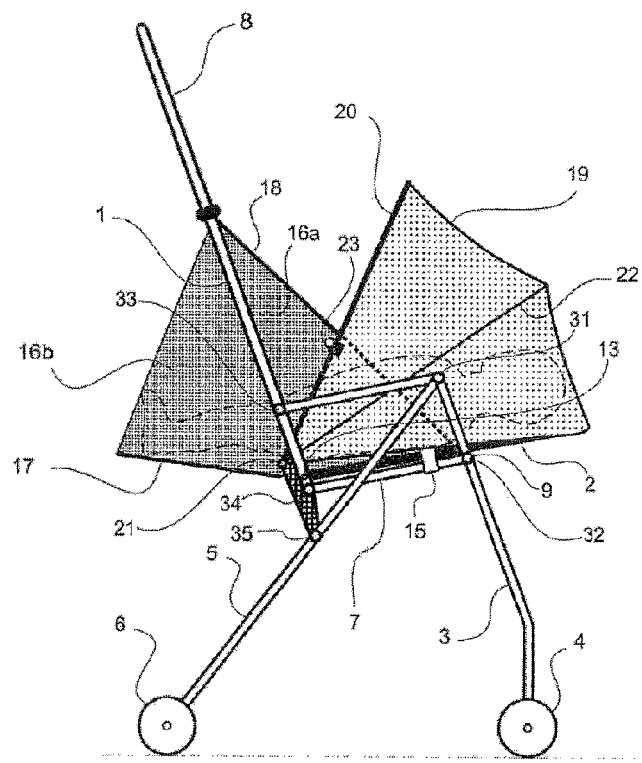
FIGS. 3A and 3B are diagrammatic side views of an example of a pushchair according to the invention using the first type of folding, respectively in the unfolded and semi-folded positions.
Figure 3B:
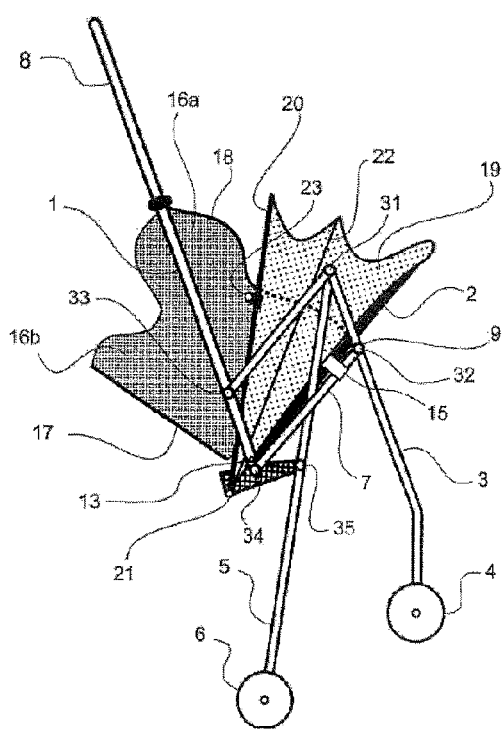

FIGS. 3A and 3B show a first embodiment of the invention using a first type of folding as described in FIG. 1, respectively in the unfolded and semi-folded positions.

The backrest 2 is folded or pulled down onto the seat formed between the seat supports 7, 7'. It is held against said seat thanks to a fixing system 15. For example, the fixing system 15 may comprise at least one strap fixed to the seat supports 7, 7'. In particular, the fixing system may consist of a strap. Naturally, other kinds of fixing system could be used for holding the backrest 2 pulled own.

Advantageously the backrest 2 may be designed to be reversible i.e. easily removable from the uprights of the handle 1, 1', then it can be positioned as required on a hinge 13 of the structure, either oriented towards the front of the pushchair in a direction of movement of the pushchair, or oriented in the opposite direction towards the rear of the pushchair.

The strap(s) of the fixing system 15 may be elastic and/or detachable from the seat supports 7, 7'. In particular, this makes it easier to remove and/or reposition the backrest 2.

Thus in unfolded position, the backrest 2 may be positioned to offer a support suitable for the upper body part of a child aged less than 6 months who would be positioned in an inclined or lying position, and facing the parent pushing the pushchair.

Also the structure of the pushchair is fitted with a textile base 16 consisting of a front part 16a and a rear part 16b.

The rear part 16b is configured to offer a support adapted to the lower body part of a newborn infant. Advantageously the base of said rear part 16b is fitted with a rigid plate 17.

The front part 16a of the textile base 16 is fixed to the structure of the pushchair thanks in particular to tensioners 18, 18' (on the side views in FIGS. 3A and 3B, only the tensioner 18 is visible), connecting the upper end of the uprights of the handle 1, 1' to a structural element situated at the front of the pushchair, for example the front of the seat supports 7, 7'. When the pushchair is in unfolded position, the tensioners 18, 18' are tensioned.

Thus in unfolded position, the sides of the textile base 16 form an advantageous lateral protection for the transport of a newborn infant.

The pushchair according to the invention is also fitted with a protective cover 19 comprising a rigid or semi-rigid main bow 20 which is mounted pivoting on a structural element of the pushchair by means of a hinge 21, the rotation axis of which is perpendicular to the plane of the drawing. Alternatively the main bow 20 may be mounted on the textile base 16, but the cover will be less well tensioned in the unfolded position.

Advantageously the protective cover 16 also comprises one or more rigid or semi-rigid secondary bows 22, which increase the inner volume of the protective cover 19 in the unfolded position.

Also the protective cover 19 comprises fixing elements 23, 23' which allow each side of the main bow 20 to be fixed to the textile base 16, advantageously close to tensioners 18, 18' or directly on the tensioners. Also the front part of the protective cover 19 is advantageously held fixed to the upper part of the backrest 2. Thus tensioning of the tensioners 18, 18' allows tensioning of the protective cover 19, thanks to the action of the fixing system 15 holding the backrest 2 against the seat formed between the seat supports 7, 7'.

On folding of the pushchair (FIG. 3B), the upper end of the handle uprights 1, 1' moves closer to the front edge of the seat formed between the front ends of the seat supports 7, 7'. The effect of this is to loosen the tensioners 18, 18', which at the same time allows the folding of the front part 16a of the textile base 16 and the folding of the cover 19, so that these two elements occupy a reduced space in the folded position.

Also during this folding operation, the rear part 16b of the textile base 16 may easily be folded for example by lifting the rigid plate 17.

Conversely, on unfolding of the pushchair (transition from FIG. 3B to FIG. 3A), tensioners 18, 18' are retensioned. In fact the fixing points of these tensioners 18, 18'—in this case the upper end of the handle uprights 1, 1' and the front edge 9 of the seat—are two structural elements of the pushchair which move apart during unfolding. Consequently, on unfolding of the pushchair:

firstly, the front part 16a of the textile base 16 deploys, and secondly, thanks to the action of the fixing elements 23, 23' on the main bow 20, the cover 19 deploys and is tensioned automatically, which offers the advantage that the user of the pushchair does not have to raise said cover 19 manually after having unfolded the pushchair.

Advantageously the fixing elements 23, 23' are detachable and it is also possible to provide an intermediate fixing point (not shown) for said fixing elements 23, 23', situated lower down along tensioners 18, 18'. Thus when the pushchair is in the unfolded position, it is possible either to lower the cover 19 completely by detaching the fixing elements 23, 23', or to fold said cover 19 partially by fixing the fixing elements 23, 23' to the intermediate fixing point. These configurations do not affect the folding of the pushchair as described in FIG. 3B. On the contrary, on unfolding of the pushchair, the cover 19 will automatically resume a lowered, semi-lowered or raised position depending on whether the fixing elements 23, 23' have been left detached, in the intermediate position or in the high position. Thus a device is provided which advantageously memorises the position of the cover on the folding/unfolding operations.

Figure 4A:
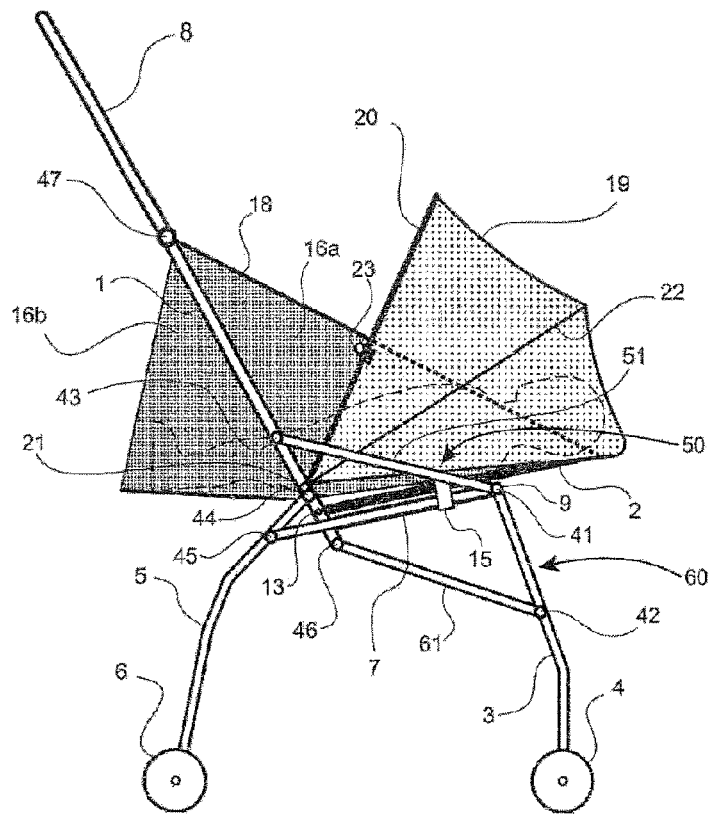
FIGS. 4A and 4B are diagrammatic views of an example of a pushchair according to the invention using the second type of folding, respectively in the unfolded and semi-folded positions.
Figure 4B:
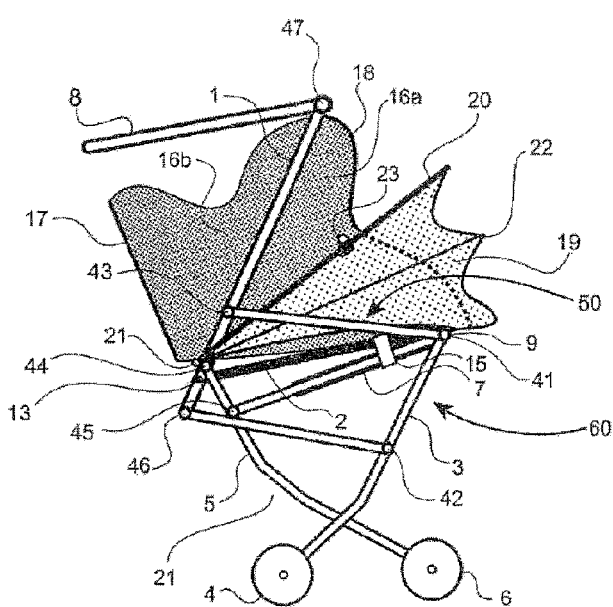
Figure 5A:
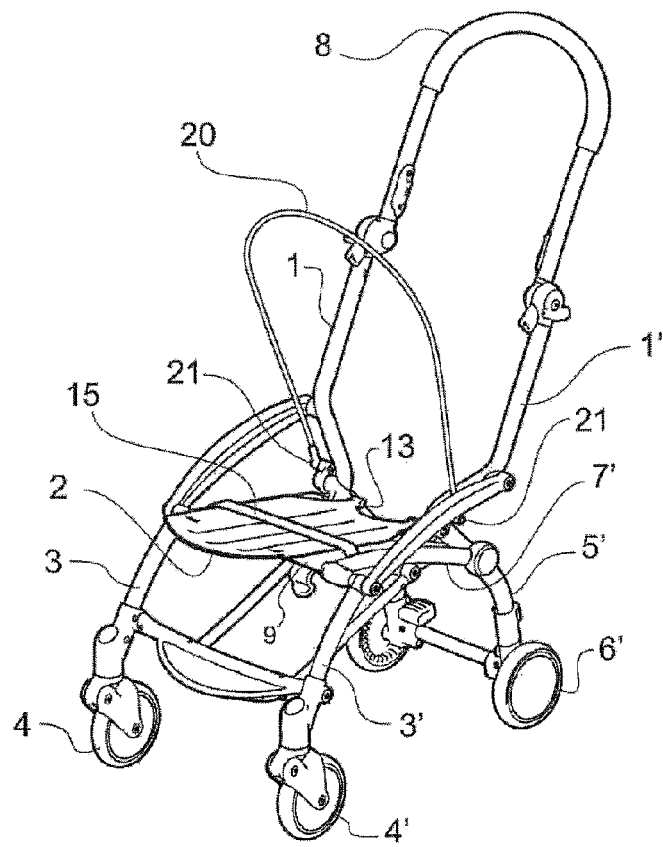
FIGS. 5A and 5B are perspective views of an example of a pushchair shown on FIGS. 4A and 4B using the second type of folding, respectively without textile elements and with textile elements.
Figure 5B:
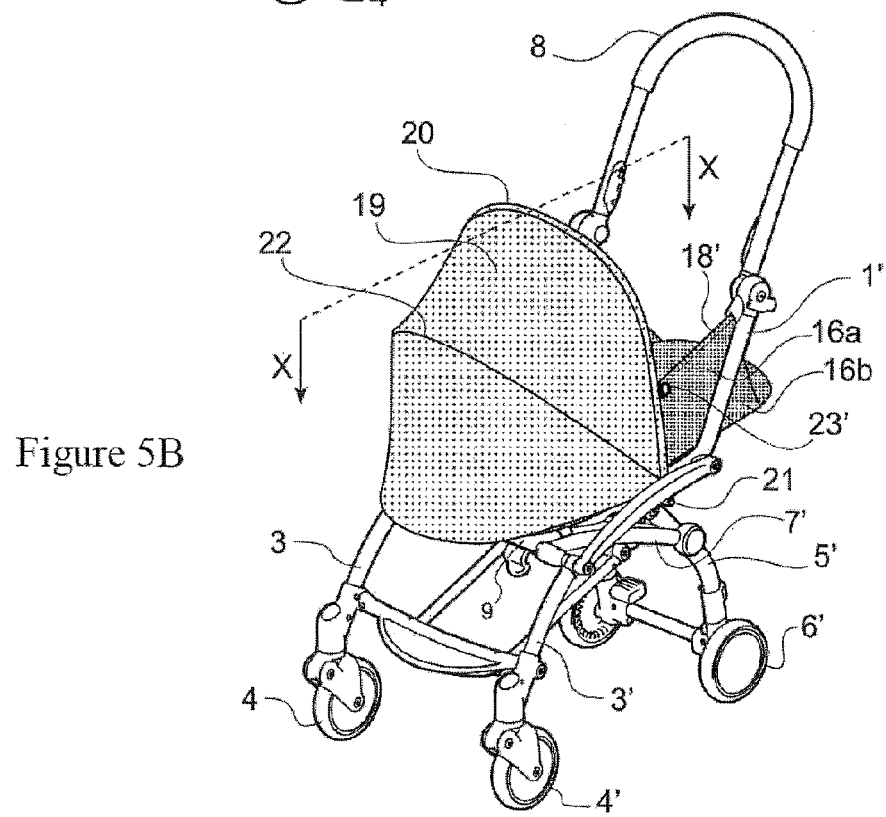

FIGS. 4A and 4B represent a second embodiment of the invention using the second type of folding as illustrated by means of FIGS. 2A and 2C, respectively in unfolded and semi-folded position. FIGS. 5A and 5B show a perspective view of the structure of an exemplary pushchair of the type shown on FIGS. 4A and 4B, respectively without its textile elements then fitted with its textile elements, namely the textile base 16 and the protective cover 19.

As before, in the unfolded position, the backrest 2 is positioned to hold a child in a lying position facing the rear of the pushchair. The backrest is held against the seat supports 7, thanks to the fixing system 15. In this example the fixing system 15, for example a strap fixed to the seat supports 7, 7', allows translation of the backrest 2 along the seat supports 7, 7'. In particular, as shown in the drawings (see e.g. FIG. 5A), the seat supports 7, 7' may extend on both sides of the seat 2, respectively, and the seat 2 may translate or slide under the strap which is fastened to the seat supports 7, 7' and extends over the seat 2.

In this embodiment, the tensioners 18, 18' connect the upper end of the handle uprights 1, 1' to the upper part of the inclinable backrest 2. When the pushchair is in the unfolded position (FIG. 4A), tensioners 18, 18' are tensioned thanks to the action of the fixing system 15 holding the backrest 2 folded against the seat.

In this example, the backrest 2 is mounted pivoting on a structural element, advantageously on a lower part of the handle uprights 1, 1', by means of a hinge 13 with axis perpendicular to the direction of movement of the pushchair. As explained before, on folding of the pushchair (FIG. 4B), the quadrilateral 50 formed by the intersection points of hinges 41, 43, 44, 45 with the lateral section plane deforms, which—because of the position of the hinge 13 of the backrest 2 on the lower part of the handle uprights—causes the hinge 13 to move away from the hinge 41, advantageously superimposed on the front edge 9 of the seat defined by the ends of the seat supports 7, 7'. Consequently, the backrest 2 slides back along the seat supports 7, 7' while being held against said seat supports 7, 7' thanks to the fixing system 15. When the pushchair is fully folded, the backrest 2 is substantially back in the same position as in the pushchair configuration described in FIG. 2C, i.e. the upper part of the backrest 2 is again folded substantially at the same level as the upper part of the handle uprights 1, 1' and the hinge 41 at the front end 9 of the seat.

Also, during this folding operation, the upper ends of the handle uprights 1, 1' move closer to the upper part of the inclinable backrest 2. The effect of this is to loosen the tensioners 18, 18' allowing folding of the textile base so that it occupies a reduced space in the folded position.

As in the previous example, the pushchair is also fitted with a protective cover 19 comprising a rigid or semi-rigid main bow 20 which is advantageously fixed to the pushchair structure by means of a hinge 21.

In the example shown on FIGS. 4A, 4B, the hinge 21 is arranged on the upper ends of the rear legs 5, 5'.

Advantageously the axis of hinge 21 is offset in relation to the axis of hinge 44 of the rear legs 5, 5' relative to the support of the backrest 1 and situated above and behind said hinge 44 when the pushchair is in the unfolded position. Thus on folding of the pushchair (FIG. 4B), the main bow 20 pivots freely about hinge 21. Also, during this operation, because of the rotation of the rear leg 5 in relation to the seat support 7 and because of the offset position of the axis of hinge 21 in relation to the axis of hinge 44, said hinge 21 moves away from the front edge 9 of the seat. Thus in the folded position, the main bow 20 takes up a minimum space in relation to the structure of the pushchair. It is therefore possible to dimension this main bow 20 with sufficient height to offer optimum volume for the cover 19 in the unfolded position, without said main bow 20 significantly increasing the dimensions of the pushchair in the folded position.

Thus once completely folded, the pushchair according to the invention occupies a volume which is substantially the same as that of the pushchair of the prior art as shown on FIG. 3C, without any need to remove any element.

Figure 6:
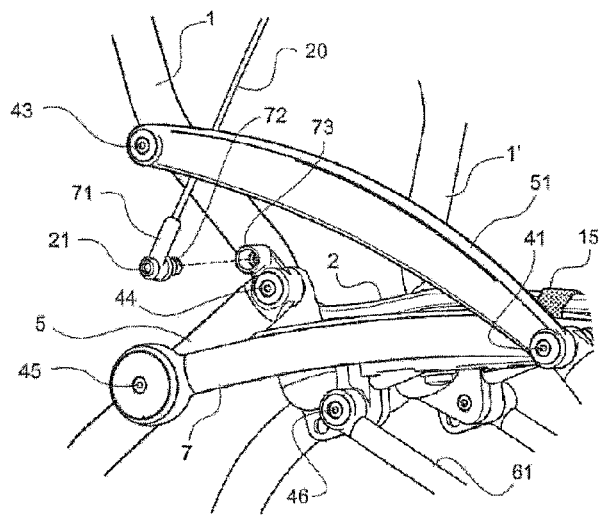
FIG. 6 shows a detail of a type of embodiment of the fixing system of the protective cover on the structure of a pushchair using the second type of folding.

FIG. 6 is a perspective view of a detail of the structure of a foldable pushchair according to the invention. It illustrates an exemplary fixing of the hinge 21 of the main bow 20 on the structure of the pushchair, at the upper ends of the rear legs 5 and close to the hinge 44.

In this example, on each side of the pushchair, the hinge 21 comprises a first sleeve 71 with an orifice to receive the main bow 20 and a second sleeve 72, the axis of which is perpendicular to that of the sleeve 71. The sleeve 71 is recessed into a cylindrical housing 73 fixed to the upper end of the rear leg 5, the axis of which lies slightly above and behind the axis of hinge 44.

Figure 7A:
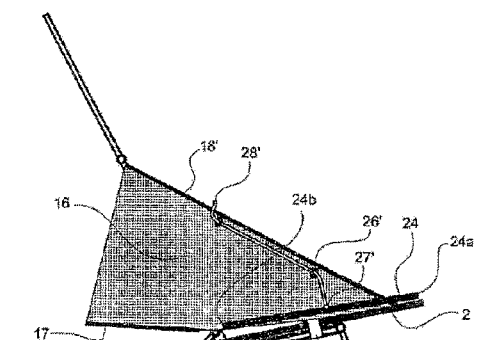
FIGS. 7A and 7B are diagrammatic side views, in longitudinal section, of a variant embodiment of the invention.
Figure 7B:
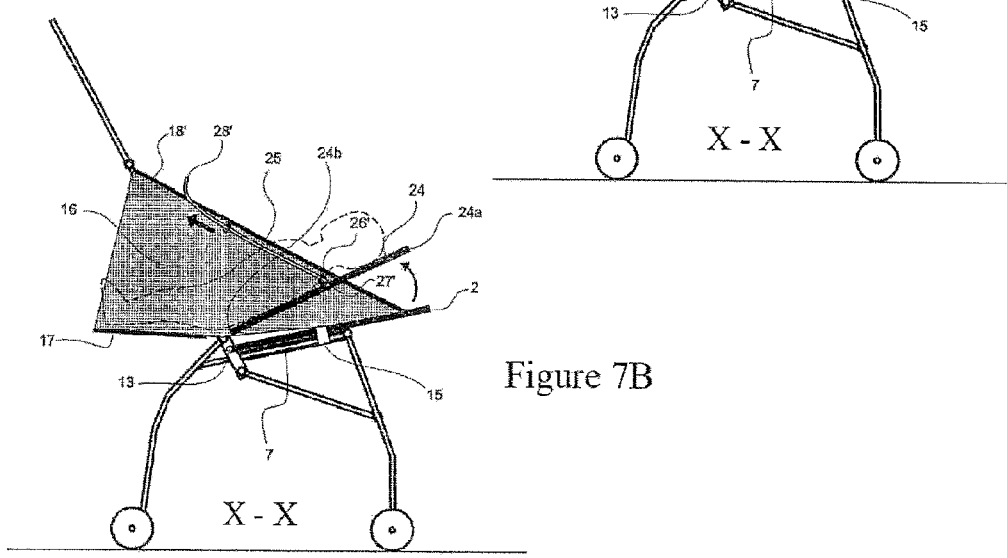

FIGS. 7A and 7B show diagrammatically a longitudinal section along the median plane X-X of the pushchair shown on FIG. 5B, in one variant of the invention.

In this variant, the textile base 16 is fitted with an additional device comprising in particular a dorsal plate 24 formed from a rigid or semi-rigid material. The front end 24a of said dorsal plate 24 is free while its rear end 24b is fixed to the back of the textile base 16. Thus the dorsal plate 24 can pivot in rotation in relation to the back of the textile base 16.

In the lowered position, the dorsal plate 24 is substantially folded against the backrest 2.

Also the dorsal plate 24 is fitted with a lifting system integrated in the inner flanks of the textile base 16, comprising for example traction elements 25, 25' of the cable or strap type which can slide inside said textile base 16. To this end each traction element 25, 25' passes in particular through an eyelet 26, 26' provided in the textile base 16. The lower ends 27, 27' of the traction elements 25, 25' are also fixed to the dorsal plate 24.

When a traction is exerted on the upper end 28, 28' of traction elements 25, 25' (FIG. 7B), the dorsal plate 24 lifts by pivoting at its rear end 24b and can then be held in the raised position thanks to any locking system (not shown). The textile base 16 then offers a seated or semi-seated position for the newborn infant.

When the dorsal plate 24 is held in the top position, this does not affect the folding of the pushchair as described in the examples of the FIG. 3B or 4B. In fact when the tensioners 18, 18' are no longer under tension, the dorsal plate 24 is free once again to lie against the backrest 2. In the converse case, on unfolding of the pushchair, depending on whether the traction elements 25, 25' have been left in the low or high position, the dorsal plate 24 will respectively resume a lowered or raised position thanks to the tensioning of the tensioners 18, 18'. Thus an advantageous device is provided which memorises the seat position during the folding/unfolding operation.

Thus thanks to the invention just described, it is possible to provide a pushchair suitable for transport of a newborn infant facing the parent, which is very simple to unfold and fold without the need to remove any element, and which is fitted with an effective protective cover. This device also has the advantage that, on unfolding of the pushchair, the protective cover deploys automatically into the position which it held prior to folding. Similarly, if this device is supplemented with an adjustable dorsal plate, on unfolding, this dorsal plate resumes the position it held prior to folding. In the case where the invention is applied to a pushchair with the type of folding described by means of FIGS. 2A to 2C, the invention also offers a very compact design in the folded position despite the presence of the textile base and cover.

The invention is described above as an example. It is understood that the person skilled in the art is able to produce different variants of embodiments of the invention. In particular the person skilled in the art will be able to adapt the devices described above to other types of flat-folding pushchairs, such as for example that described in the abovementioned patent application U.S. Pat. No. 5,087,066. Further, the features of the embodiments, variants or examples disclosed herein can be used alone or in various combinations with each other, and are not intended to be limited to the specific combinations disclosed herein.

The invention claimed is:

1. A flat-folding pushchair which is moveable between an unfolded position and folded position, comprising:
   a structure comprising two handle uprights, at least one front leg, at least one rear leg, seat supports, a backrest, and hinges for folding the pushchair flat;
   a textile base;
   tensioners for tensioning a front part of the textile base and each connecting an upper end of a handle upright to a structural element situated at the front of the pushchair;
   a protective cover with at least one main bow, wherein:
   the protective cover also comprises fixing elements allowing each side of the main bow to be fixed to at least one fixing point of each of the tensioners or to at least one fixing point of the front part of the textile base,
   in the unfolded position, the backrest is positioned to hold a child at least in a lying position facing the rear of the pushchair, said backrest being also held against the seat supports by a fixing system,
   in the unfolded position, the tensioners are tensioned and allow deployment of the front part of the textile base and the protective cover, and
   on folding, the forward swivelling of the handle uprights loosens the tensioners, causing folding of the front part of the textile base and the protective cover.

2. The flat-folding pushchair according to claim 1, wherein the main bow of the protective cover is mounted on a structural element by a hinge with axis perpendicular to the direction of movement of the pushchair.

3. The flat-folding pushchair according to claim 1, wherein the fixing elements of the protective cover are detachable.

4. The flat-folding pushchair according to claim 1, wherein a front part of the protective cover is held fixed to the upper part of the backrest.

5. The flat-folding pushchair according to claim 1, wherein the tensioners each connect an upper end of a handle upright to an upper end of the backrest.

6. The flat-folding pushchair according to claim 1, wherein the backrest is mounted pivoting on a structural element by means of a hinge with axis perpendicular to the direction of movement of the pushchair.

7. The flat-folding pushchair according to claim 1, wherein the backrest is reversible in that, in the unfolded position of the pushchair, the backrest moves from a first position adapted to hold a child in the lying position facing the rear of the pushchair, to a second position adapted to hold a child in the seated position facing the front of the pushchair.

8. The flat-folding pushchair according to claim 1, wherein a rear part of the textile base is fitted with a rigid plate.

9. The flat-folding pushchair according to claim 1, further comprising a rigid or semi-rigid dorsal plate, a rear end of which is mounted pivoting at the back of the textile base.

10. The flat-folding pushchair according to claim 1, wherein, on movement of the pushchair from its unfolded position to its folded position, the hinges allow the forward swivelling of the lower ends of the rear legs, the rearward swivelling of the lower ends of the front legs, the folding of the handle uprights against the seat support, wherein the upper edges of the handle uprights come to face the front end of the seat support and the upper ends of the front legs.

11. The flat-folding pushchair according to claim 10, wherein the main bow of the protective cover is mounted on an upper end of the rear leg on each side of the pushchair by means of a hinge with axis perpendicular to the direction of movement of the pushchair.

12. The flat-folding pushchair according to claim 11, wherein the axis of the hinge of the main bow is offset in relation to a hinge of the rear leg.

13. The flat-folding pushchair according to claim 11, wherein the backrest is mounted pivoting on a lower end of the handle uprights by a hinge with axis perpendicular to the direction of movement of the pushchair.

14. The flat-folding pushchair according to claim 1, wherein the fixing system allows the backrest to slide along the seat supports.

15. The flat-folding pushchair according to claim 1, wherein the fixing system comprises a strap fastened to the seat supports.

* * * * *